United States Patent [19]

Dickinson

[11] 4,428,144
[45] Jan. 31, 1984

[54] FISHING DEVICE

[75] Inventor: Robert J. Dickinson, Mitchell, S. Dak.

[73] Assignees: James L. Wagner; Dennis R. Padrnos, both of Mitchell, S. Dak. ; part interest to each

[21] Appl. No.: 375,958

[22] Filed: May 7, 1982

[51] Int. Cl.³ .............................................. A01K 95/00
[52] U.S. Cl. ........................ 43/44.96; 43/42.39/42.53
[58] Field of Search ............... 43/44.96, 44.97, 42.39, 43/42.53, 42.74, 43.1, 43.15, 44.81

[56] References Cited

U.S. PATENT DOCUMENTS

| | | | |
|---|---|---|---|
| 2,157,819 | 5/1939 | Eckert | 43/43.15 |
| 2,591,294 | 4/1952 | Ripich | 43/43.15 |
| 3,137,962 | 6/1964 | Linley | 43/44.96 |
| 3,253,363 | 5/1966 | Steehn | 43/44.97 |
| 3,504,454 | 4/1970 | Turbeville | 43/42.53 |
| 3,783,549 | 1/1974 | Griggs | 43/44.97 |
| 3,798,824 | 3/1974 | Nikota | 43/43.15 |
| 3,828,463 | 8/1974 | Perrin | 43/42.39 |
| 4,161,838 | 7/1979 | Gapen | 43/42.11 |
| 4,314,420 | 2/1982 | Dickinson et al. | 43/42.39 |

Primary Examiner—Gene P. Crosby
Attorney, Agent, or Firm—Kinney, Lange, Braddock, Westman and Fairbairn

[57] ABSTRACT

A wire sinker and lure support device includes a pair of trailing wire legs with forward ends and free trailing ends. The forward ends are connected to each other and to an upstanding leg which has a loop for attaching a fishing line and a lure leader. The trailing legs are aligned in parallel and a bored sinker is slipped over the trailing legs to the connection of the forward ends. The trailing leg portions are then spread into a V-shaped support base which holds the sinker on the device. The support base engages the bottom when the device is in operation and maintains the upstanding portion off the bottom, so that a lure on the leader is off the bottom.

30 Claims, 6 Drawing Figures

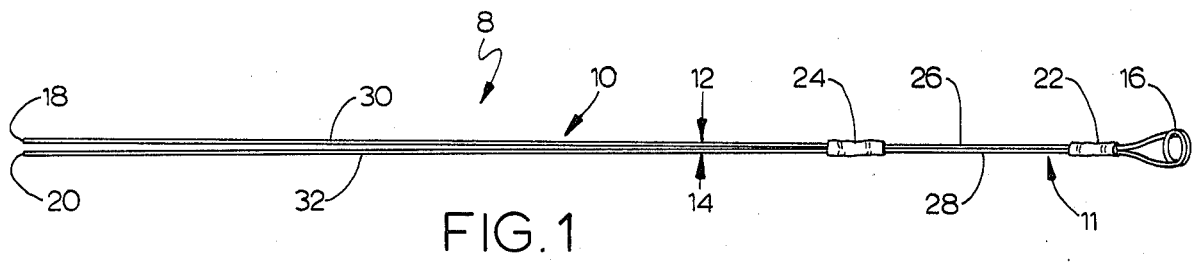
FIG. 1
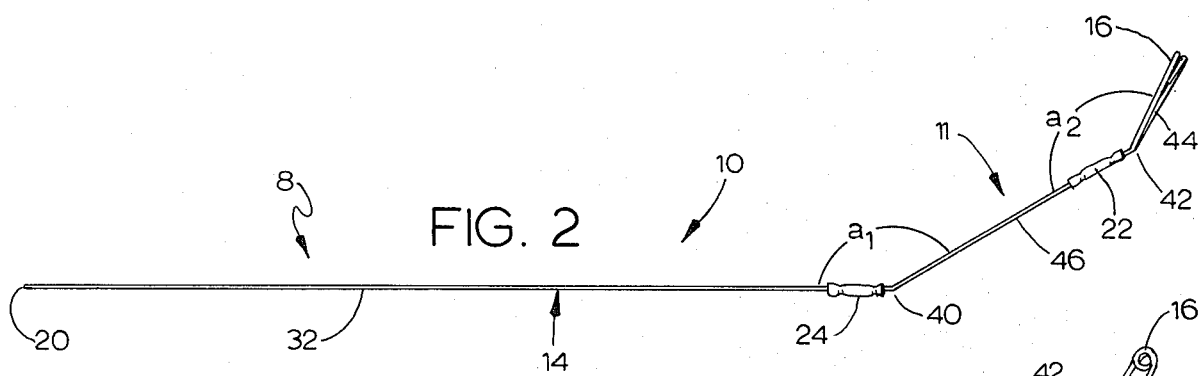
FIG. 2
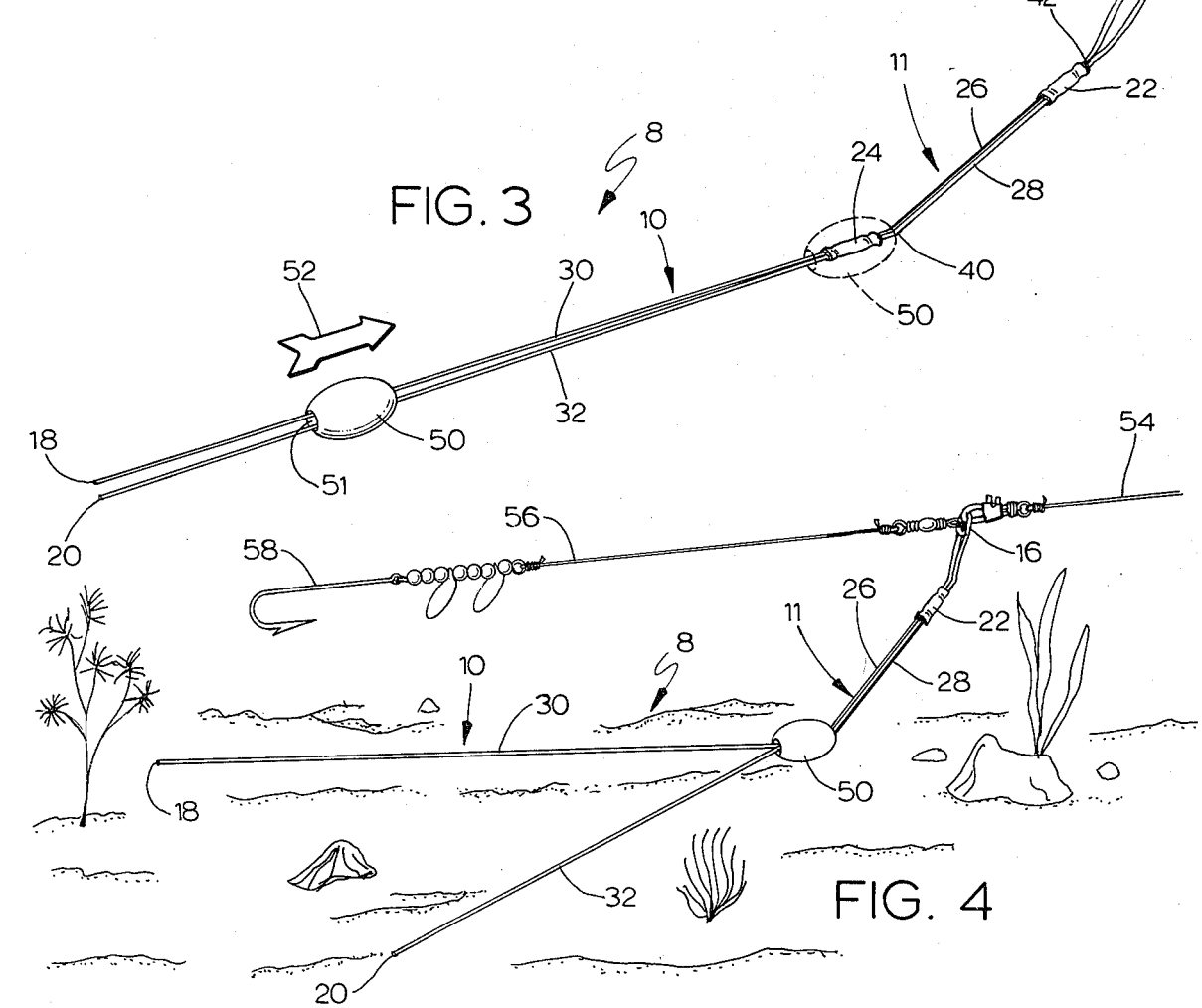
FIG. 3
FIG. 4

FISHING DEVICE

BACKGROUND OF THE INVENTION

1. Field of the Invention

The present invention relates to bottom-engaging fishing devices which are weighted by a sinker and which allow a fisherman to present a lure or bait just off the bottom.

2. Description of the Prior Art

Modern theories of structure fishing teach that fish reside in deeper water than was formerly fished by sportsmen. One tenet of this fishing doctrine holds that the fish suspend just off the bottom. As a result, many devices have been constructed in an attempt to find an effective and inexpensive method of presenting a lure just off the bottom of the lake, stream or river being fished.

In my U.S. Pat. No. 4,314,420 entitled "Fishing Device," issued to James L. Wagner and me on Feb. 9, 1982, is disclosed a bottom-engaging sinker and lure holder in which trailing legs keep the device upright and allow the fisherman to present his lure off of the bottom. In the prosecution of this patent, the following U.S. patents were referenced:

| Inventor | Patent No. | Issue Date |
| --- | --- | --- |
| Gapen | 4,161,838 | 7/79 |
| Griggs | 3,783,549 | 1/74 |
| Perrin | 3,828,463 | 8/74 |
| Steehn | 3,253,363 | 5/66 |
| Eckert | 2,157,819 | 5/39 |
| Turbeville | 3,504,454 | 4/70 |
| Ripich | 2,591,294 | 4/52 |

The two most pertinent patents were deemed to be Gapen, which discloses a bottom-engaging sinker, and Griggs, which discloses a fishing lure with trailing wire legs.

Turbeville discloses a type of lure commonly referred to as a spinner belt, which includes an L-shaped wire with an end embedded in the lead head molded around the eye of a fish hook.

The Ripich patent is essentially the same as the Gapen patent in that it also shows a pear-shaped sinker with an L-shaped wire attached, extending out of the front, narrow end of the sinker.

The Perrin patent shows a fishing lure with a hollow floating body. The Eckert patent discloses a bait float which is not particularly relevant to the present invention. The Steehn patent discloses a spinner bait designed to rock forward to clear an obstacle encountered during the retrieve.

SUMMARY OF THE INVENTION

The present invention is an improved device for presenting fishing lures and baits just off the bottom of a body of water, of the type which employs a weighted sinker and has a pair of trailing legs which help maintain the device in an upright position. An improved fishing device constructed according to the present invention includes a base support section with first and second trailing wire legs. Each trailing leg has a forward end and a free trailing end. A first connecting means secures the forward ends of the trailing legs to each other so that the trailing legs are held generally parallel and are adapted to receive a bored sinker mounted over the free trailing ends. The sinker is slid to a position adjacent the connecting means. The trailing legs are further adapted to be spread by separating the free trailing ends to form a generally V-shaped support base. The device also includes an upstanding section with at least one upstanding wire leg having a lower end fixedly held in the first connecting means so that the upstanding leg is maintained in a position off the bottom when the trailing legs are spread to form the generally horizontal bottom-engaging support base. Attachment loop means includes an attachment loop formed in the upstanding leg which is located above the trailing legs.

In one preferred embodiment, a fishing device constructed according to the present invention includes a pair of generally congruent wire segments connected at one end to form the attachment loop for attaching a fishing line and a lure leader or drop line. The attachment loop is preferably helical. Each segment has a first bend which defines the upstanding leg, which contains the loop, and the trailing leg with the free trailing end. Means are provided to connect the pair of segments at a point adjacent the first bends.

The device preferably has a second bend in each wire at a point adjacent the attachment loop. Second connecting means for joining the pair of wire legs is positioned adjacent the second bend.

In one form of this embodiment, the device is formed by bending a single wire generally at its midpoint to form the attachment loop and two wire segments. The segments are connected at a first point spaced apart from the loop. The device is bent adjacent the first point, preferably to form an angle of about 120° between the upstanding and the trailing legs. A second means for connecting is preferably mounted on the wires adjacent the loop.

The preferred means for connecting the wires is a metal sleeve which is slid over both trailing legs to the proper position and crimped to secure the wires. The wires are preferably tinned music wire, commonly known as piano wire.

BRIEF DESCRIPTION OF THE DRAWINGS

FIG. 1 is a top plan view of a first embodiment of a fishing device constructed according to the present invention;

FIG. 2 is a side elevational view of the fishing device of FIG. 1;

FIG. 3 is a perspective view of the device of FIG. 1 with a sinker in the process of being installed;

FIG. 4 is a perspective view of the fishing device, with a sinker installed, in operation supporting a drop line and a fish hook;

DETAILED DESCRIPTION OF THE PREFERRED EMBODIMENTS

Figure 5:
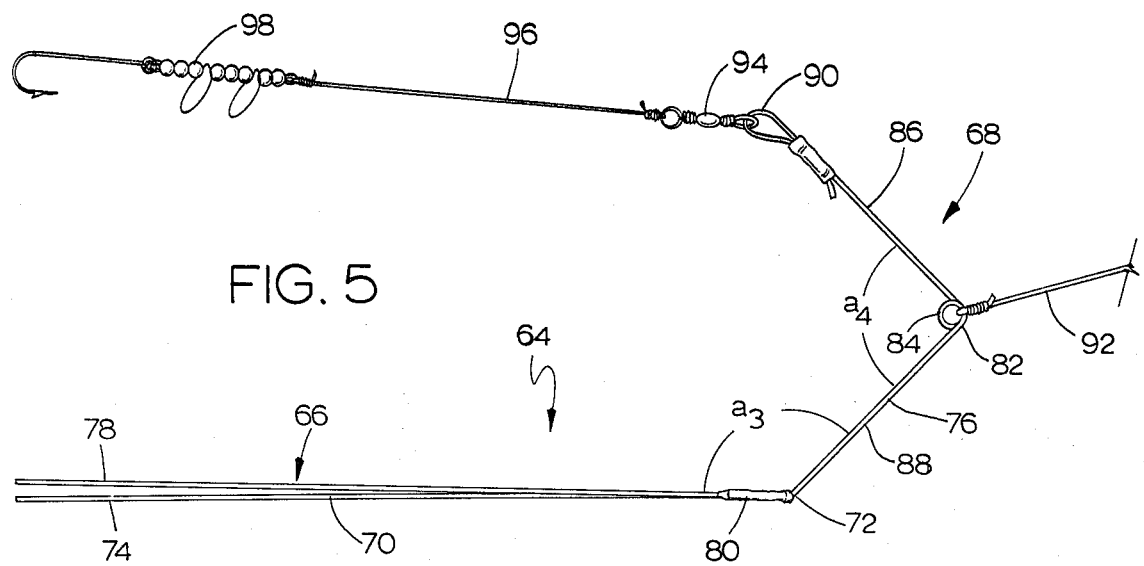
FIG. 5 is a side elevational view of another embodiment of a fishing device constructed according to the present invention.

A sinker and lure support device 8 includes a base support section 10 and an upstanding section 11. In the first preferred embodiment illustrated in FIGS. 1–4, device 8 includes first and second wire segments 12 and 14. Segments 12 and 14 are connected at an upper end to form an attachment loop 16, which is preferably helical. In the preferred embodiment, segments 12 and 14 and loop 16 are formed from one integral wire, about 18 inches in length, which is bent generally near its midpoint to form loop 16. First segment 12 has a free end 18 and second segment 14 has a free end 20.

First segment 12 and second segment 14 are attached by a connecting means, which, in this illustration, is an upper metal sleeve 22. Metal sleeve 22 is mounted over free ends 18 and 20 and slid up wire segments 12 and 14 to a position adjacent attachment loop 16. Sleeve 22 is then crimped to secure wire segments 12 and 14 to each other. Segments 12 and 14 are further secured by a lower metal sleeve 24 which, like sleeve 22, is mounted over free ends 18 and 20 and slid up segments 12 and 14. Lower sleeve 24 is positioned between upper sleeve 22 and free ends 18 and 20, to divide each segment 12 and 14 into an upstanding leg 26 and 28, respectively, and a trailing leg 30 and 32, respectively. Lower sleeve 24 is preferably positioned so that trailing legs 30 and 32 are longer than upstanding legs 26 and 28, respectively. In the example illustrated, the trailing legs 30 and 32 are approximately twice as long as upstanding legs 26 and 28.

Upstanding legs 26 and 28, once sleeves 22 and 24 are installed, are generally adjacent and parallel. Trailing legs 30 and 32 are separable by moving apart free ends 18 and 20.

The wire used to construct sinker and lure support device 8 is bendable wire which will generally retain any shape to which it is bent. In the example illustrated, the device 8 is constructed of 0.031 inch music tinned stainless steel fishing wire, which is commonly referred to as piano wire.

Device 8 has a first bend 40 at a point adjacent lower metal sleeve 24. In the example illustrated, first bend 40 is on the side of sleeve 24 toward upstanding legs 26 and 28, but other configurations may be used to practice the invention. Angle $a_1$ between upstanding legs 26 and 28 and trailing legs 30 and 32, respectively, is, in this example, about 120°.

A second bend 42 in upstanding legs 26 and 28 is made generally adjacent upper metal sleeve 22. Second bend 42 divides upstanding legs 26 and 28 generally into an upper or loop portion 44 and a lower portion 46. Angle $a_2$ formed by second bend 42 is, in this example, equal to approximately 120°. Second bend 42 is made in generally the same direction, relative to trailing legs 30 and 32, as first bend 40.

The device 8 as illustrated in FIGS. 1 and 2, is used in conjunction with a sinker 50 with a bore 51 therethrough. Installation of bored sinker 50 is illustrated in FIG. 3. The bored sinker 50 is slipped over free ends 18 and 20 and is slid up trailing legs 30 and 32 in the direction of arrow 52. Sinker 50 is moved up to the position shown in dotted lines in FIG. 3, where it is generally adjacent the first bend 40. In the example illustrated, sinker 50 encases metal sleeve 24. Sinker 50 is any weighted device, such as a common lead egg sinker which is bored to accept trailing legs 30 and 32. Sinker 50 can be of any weight needed to fit the particular fishing conditions in which device 8 is used. For instance, greater depth or retrieve speed requires a heavier sinker 50.

Once sinker 50 is positioned adjacent bend 40, trailing legs 30 and 32 are spread apart, as illustrated in FIG. 4, so that free ends 18 and 20 are spaced apart. In a preferred embodiment, trailing legs 30 and 32 are spaced apart sufficiently to secure sinker 50 adjacent bend 40 and also to provide a generally horizontal support base formed by the V-shaped configuration of sinker 50 and trailing legs 30 and 32. This support base maintains upstanding legs 26 and 28 and attachment loop 16 in a raised position off of the bottom. A fishing line 54 from the fisherman's reel is attached to attachment loop 16 for use in trolling or casting and retrieving device 8. A drop line or leader 56, to which is attached a fishing hook or lure 58, is also attached to loop 16.

Figure 6:
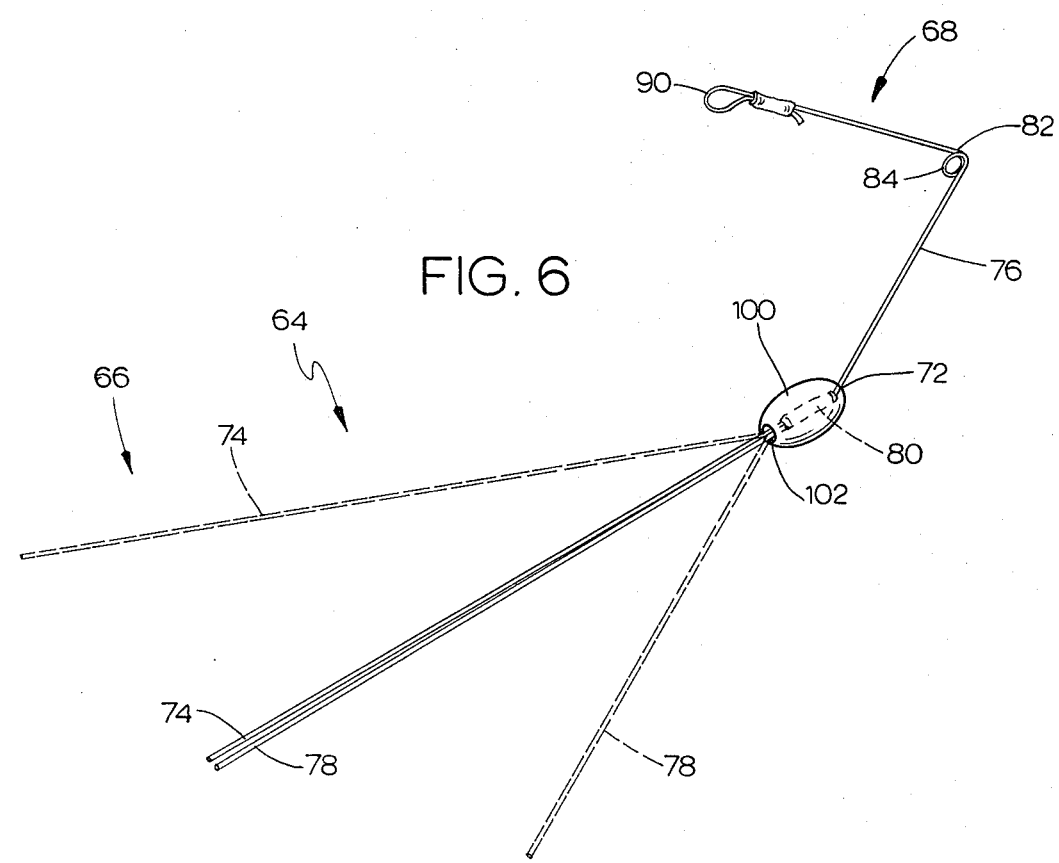
FIG. 6 is a perspective view of the device of FIG. 5 with a sinker installed.

Another preferred embodiment of the present invention is illustrated in FIGS. 5 and 6. Sinker and lure support device 64 has a base support section 66 and an upstanding section 68. In this embodiment, a wire segment 70 has a first bend 72 which forms an obtuse angle between a first trailing leg 74 and an upstanding leg 76. The angle $a_3$ of first bend 72 is preferably 120°. A second trailing leg 78 is aligned generally parallel to first trailing leg 74 and attached to it by connecting means which, in this example, is a metal sleeve 80. In the example illustrated, metal sleeve 80 is soldered in place to fixedly hold second trailing leg 78 to wire segment 70 adjacent bend 72.

Upstanding leg 76 has a second bend 82 which forms a line attachment loop 84. Line attachment loop 84 is preferably helical. Angle $a_4$ of second bend 82 is approximately 90°. Second bend 82 divides upstanding leg 76 into an upper portion 86 and a lower portion 88. At the free end of upper section 86 is formed a leader attachment loop 90.

A fishing line 92 from a fisherman's reel is shown attached to line attachment loop 84 in FIG. 5. A barrel swivel 94 is attached to leader attachment loop 90. Leader 96 is attached to the barrel swivel 94 so that a lure 98 on leader 96 is free to spin.

In other forms of this embodiment, first trailing leg 74 is not integral with upstanding leg 76. One skilled in the art can design appropriate connecting means to attach trailing legs 74 and 78 and upstanding leg portion 76 to practice the present invention.

FIG. 6 shows a sinker 100 with a bore 102, which has been slipped over trailing legs 74 and 78 to a position adjacent metal sleeve 80 and first bend 72. Trailing legs 74 and 78 are then spread to the base support position illustrated in dotted lines in FIG. 6. In this base support position, sinker 100 is held in its position adjacent sleeve 80. The V-shaped support base formed by trailing legs 74 and 78 holds upstanding leg 76, including line attachment loop 84 and leader attachment loop 90, off the bottom. This support base helps to prevent device 8 from tipping in operation, and it maintains upstanding leg 76 off the bottom even when device 64 is stopped during the retrieve.

A sinker and lure support device constructed according to the present invention greatly simplifies the manufacturing, packaging, storage, and use of this effective style of fishing device. The device is not only simple to manufacture (since it includes only bending wire and crimping or soldering sleeves) but also very inexpensive due to its low material and labor cost.

The improved device is convenient to package. The trailing leg portions are aligned in order to fit the device in a conventional plastic bag or blister package. The device is also easy to store in a tackle box because of the flexibility of the trailing leg portions. Once the sinker is removed, the trailing leg portions are realigned in parallel for storage.

Additionally, one improved sinker and lure support is used with a range of sinker weights to fit the gamut of fishing conditions. Any weight and shape sinker desired for a particular fishing application can be quickly installed on device. If conditions change, the trailing legs are bent back into a parallel position and the sinker may be removed quickly and easily. A new weight sinker is selected and installed, without disengaging either the fishing line or leader.

Although the present invention has been described with reference to preferred embodiments, workers skilled in the art will recognize that changes may be made in form and detail without departing from the spirit and scope of the invention.

What is claimed is:

1. An underwater bottom-engaging sinker holder and lure support device comprising:

first and second wire trailing legs, each trailing leg having a forward end and a free trailing end;

connecting means for connecting the forward ends of the trailing legs to each other, so that the trailing legs have a first generally parallel position in which the trailing legs are adapted to receive a bored sinker mounted over the free trailing ends and slid to a position adjacent the connecting means, and a second position in which the trailing legs are spread, by separating the free trailing ends, to hold the sinker in its position and to form a generally V-shaped support base;

an upstanding section with at least one upstanding wire leg having a lower end fixedly held in the first connecting means, so that the upstanding leg is maintained in a position off the bottom above the plane of the bottom-engaging support base; and attachment loop means in the upstanding leg for attaching a fishing line and lure leader, located above and forward of the trailing ends of the trailing legs.

2. The device of claim 1 wherein the upstanding section includes two upstanding legs which are joined at their upper ends to form the attachment loop means.

3. The device of claim 2 wherein the upstanding legs and the trailing legs are formed of one continuous wire, which is bent to form the attachment loop means.

4. The device of claim 1 and wherein the attachment loop means comprises first and second attachment loops, and wherein the fishing line is attached to the first attachment loop and the lure leader is attached to the second attachment loop.

5. The device of claim 1 wherein the connecting means includes a metal sleeve surrounding and attached to the trailing legs.

6. The device of claim 1 wherein the upstanding section has a first lower portion extending forward and inclined upwardly from the forward ends of the trailing legs.

7. The device of claim 6 wherein the upstanding section further includes a second upper portion extending upwardly at an angle to the lower portion.

8. The device of claim 7 wherein an upstanding leg of the upstanding section lies generally in a plane with one of the trailing legs when the trailing leg is in the first parallel position.

9. An underwater bottom-engaging lure support device comprising:

first and second wire trailing legs, each trailing leg having a forward end and a free trailing end;

connecting means for connecting the forward ends of the trailing legs to each other;

an upstanding section with at least one upstanding wire leg having a lower end fixedly held in the first connecting means;

attachment loop means in the upstanding section for attaching a fishing line and lure leader, the attachment loop means being located above the trailing legs;

a sinker with a bore therethrough removably mounted on the trailing legs adjacent the connecting means, with the trailing legs extending through the bore in the sinker; and the free trailing ends of the first and second trailing legs being spread apart to hold the sinker in its position adjacent the connecting means and to form a generally V-shaped support base for maintaining the upstanding section off the bottom and above a plane of the support base.

10. The device of claim 9 wherein the upstanding section includes two upstanding legs which are joined at their upper ends to the attachment loop means.

11. The device of claim 9 wherein the upstanding legs and the trailing legs are formed of one continuous wire, which is bent to form the attachment loop means.

12. The device of claim 10 wherein the attachment loop means comprises first and second attachment loops, and wherein the fishing line is attached to the first loop and the lure leader is attached to the second loop.

13. An underwater bottom-engaging lure support device comprising:

a wire bent generally at its midpoint to form an attachment loop, for attaching a fishing line and a lure leader, and first and second generally similar segments, each segment having a first bend spaced apart from the loop, dividing the segments into upstanding legs connected to the loop and trailing legs lying at an obtuse angle to the upstanding legs, the upstanding legs being generally adjacent and parallel, the trailing legs being bendable to a spread support position in which free trailing ends of the trailing legs are spread apart for engaging an underwater bottom surface to support the device in an upright position wherein the upstanding legs extend generally away from the bottom so that the loop is in position to support a fishing lure off the bottom; and first connecting means for securing the first segment to the second segment generally adjacent to the first bends.

14. The device of claim 13 wherein each segment has a second bend, in generally the same plane relative to the trailing legs as the first bend, between the first connecting means and the loop and further comprising second connecting means for securing the first segment to the second segment adjacent the second bend.

15. The device of claim 13 further comprising:

a sinker with a bore therethrough mounted on the trailing legs adjacent the first bends with the trailing legs extending through the bore; and wherein the trailing legs are spread so that their trailing ends are spaced apart by a distance which is wider than the bore to secure the sinker on the sinker holder at a position adjacent the first bend.

16. A method of making an underwater bottom-engaging lure support device comprising the following steps:

bending a wire near its midpoint to form a loop and two parallel wire segments having separate trailing ends;

connecting the wire segments to each other at a first point spaced apart from the loop and from the trailing ends; and bending the connected wire segments at an obtuse angle adjacent the first point at which they are connected to form an upstanding section which includes the loop for attaching a lure and a base support section with two separate trailing legs extending rearwardly from the first point to the separate trailing ends, for holding a sinker adjacent the first point when the separate trailing ends are spaced apart.

17. The method of claim 16 further comprising the steps of connecting the segments to each other at a second point generally adjacent the loop; and bending the segments in generally the same direction adjacent the second point of connection to form a second obtuse angle.

18. The method of claim 16 wherein connecting the wire segments comprises sliding a metal sleeve over the segments and crimping the sleeve to connect the segments.

19. The method of claim 16 further comprising:
sliding a bored sinker over the two trailing legs to a position adjacent the first point; and
spreading the two trailing legs apart to hold the sinker in position on the trailing legs and to form a bottom-engaging support base.

20. A method of forming an underwater bottom-engaging fishing device comprising:
providing a sinker and lure support having two trailing legs connected at their forward ends and unconnected at their trailing ends and having an upstanding leg connected to the forward ends of the trailing legs, the upstanding leg having a first attachment loop;
slipping a sinker with a bore therethrough over the two trailing legs to a point at which the trailing legs are connected; and
spreading the trailing ends of the trailing legs to a width greater than the bore of the sinker to hold the sinker in place on the trailing legs and to form a bottom-engaging support base for positioning the upstanding leg off the bottom when the device is in operation.

21. The method of claim 20 wherein the upstanding leg is bent to form an upper portion and a lower portion, the lower portion extending forward of and upward from the forward ends of the trailing legs.

22. The method of claim 21 wherein the upper portion of the upstanding leg extends upward from and at an angle to the lower portion of the upstanding leg.

23. The method of claim 21 wherein the first attachment loop is located at the bend between the upper and lower portions.

24. The method of claim 21 wherein the upstanding leg further includes a second attachment loop in the upper portion of the upstanding leg.

25. The method of claim 24 further comprising:
attaching a fishing line to the first attachment loop; and
attaching a leader line to the second attachment loop.

26. A method of forming an underwater bottom-engaging fishing device comprising:
providing first and second parallel closely spaced wire trailing legs, each leg having a forward end and having a free trailing end;
providing at least one upstanding wire leg with a lower end adjacent the forward ends of the trailing legs and the upstanding leg extending away from the trailing legs;
connecting the forward ends of the trailing legs to each other and to the lower end of the upstanding leg;
bending the upstanding leg at an obtuse angle adjacent its connection to the trailing legs, so that the upstanding leg extends upward and forward of the trailing legs; and
forming a first attachment loop in the upstanding leg.

27. The method of claim 26 wherein the connecting of the trailing legs and the upstanding leg includes sliding a metal sleeve over the trailing legs and attaching the sleeve to the trailing legs and the upstanding leg.

28. The method of claim 26 further comprising:
bending the upstanding leg a second time in generally the same plane as the first bend to divide the upstanding leg into an upper portion and a lower portion.

29. The method of claim 26 further comprising:
sliding a bored sinker over the two trailing legs to a position adjacent the connection; and
spreading the trailing ends of the two trailing legs to hold the sinker in position on the trailing legs and to form a V-shaped bottom-engaging support base.

30. The method of claim 26 further comprising:
forming a second attachment loop in the upstanding leg.

* * * * *